Oct. 27, 1964

F. A. SCHWERTZ 3,154,636

THREE DIMENSIONAL DISPLAY DEVICE

Filed March 23, 1962

INVENTOR.
FREDERICK A. SCHWERTZ

BY *Stanley Z Cole*

ATTORNEY

Oct. 27, 1964  F. A. SCHWERTZ  3,154,636
THREE DIMENSIONAL DISPLAY DEVICE
Filed March 23, 1962

INVENTOR.
FREDERICK A. SCHWERTZ
BY
ATTORNEY

United States Patent Office 3,154,636
Patented Oct. 27, 1964

3,154,636
THREE DIMENSIONAL DISPLAY DEVICE
Frederick A. Schwertz, Pittsford, N.Y., assignor to Xerox Corporation, Rochester, N.Y., a corporation of New York
Filed Mar. 23, 1962, Ser. No. 182,028
5 Claims. (Cl. 178—6.5)

This invention relates to display devices and more particularly to three dimensional display devices.

This application is a continuation-in-part of my copending case S.N. 167,672 filed January 22, 1962.

Two dimensional display devices have proved adequate for representing two dimensional phenomena and even for representing three dimensional phenomena in certain limited applications where two dimensional presentation is tolerable. On the other hand where it is critical or even preferable that a three dimensional presentation be made currently available two dimensional display devices are inadequate. For example, the very nature of the phenomena presented on a display device may dictate the use of three dimensional presentation or the multitude of three dimensional phenomena to be presented may so clutter a two dimensional display device that a three dimensional display device will be required even though a two dimensional display would ordinarily be acceptable. More specifically, a three dimensional display device may be used to indicate the movement of shock waves moving out in all directions from an explosion or to simulate the diffusion of a material in a three dimensional liquid. This type of a display system may also serve to vertically separate indications of aircraft at different heights from a radar detector or as an indicator in a sonar system showing range bearings and depth of a target.

Owing to the wide and diverse fields of possible use for a three dimensional display device, a few of which have been outlined above, great effort has been expended to develop such a device, however no real success has been achieved up to this time.

Accordingly, it is an object of this invention to provide a novel three dimensional display device.

A further object of this invention is to provide a three dimensional display device of simple construction.

Another object of this invention is to provide a three dimensional display device capable of widely diverse uses.

Yet another object of this invention is to provide improved methods of three dimensional display.

The above and still further objects, features, and advantages of the present invention will become apparent upon consideration of the following detailed disclosure of specific embodiments of the invention, especially when taken in conjunction with the accompanying drawings, wherein.

Figure 1:
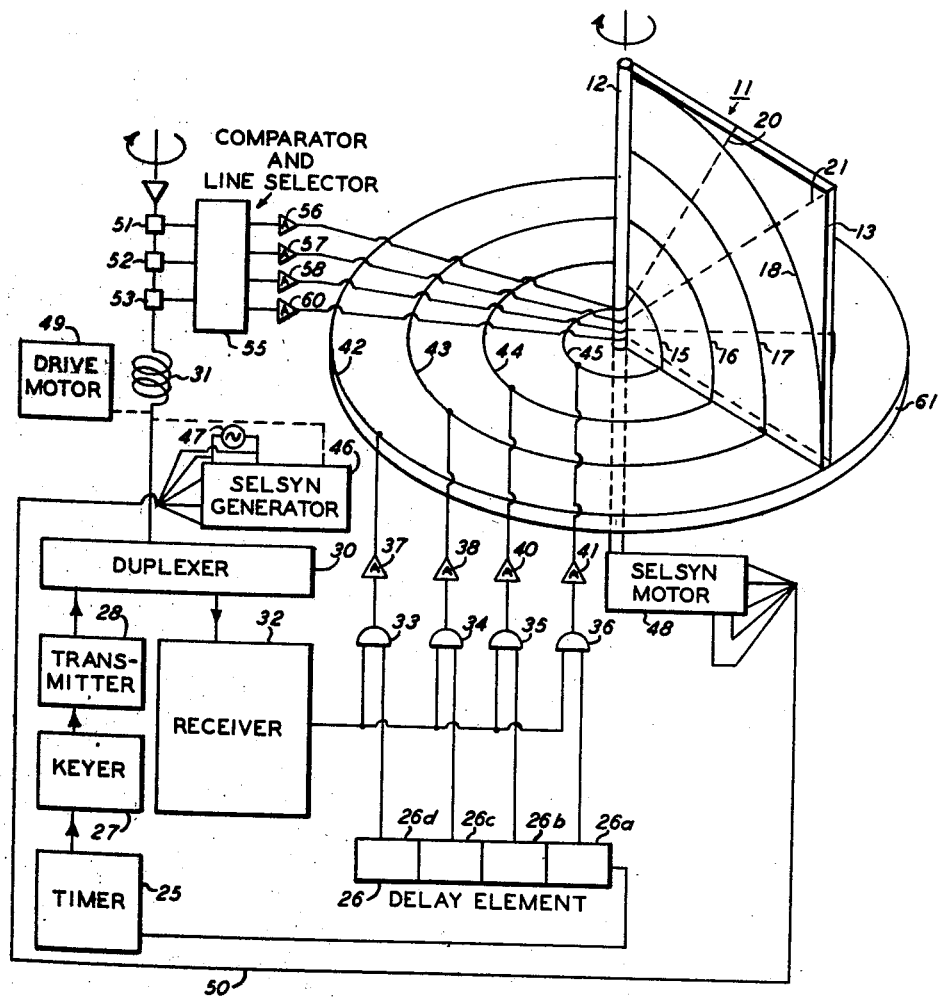
FIGURE 1 shows an embodiment of the novel display device connected in a complete radar system.
Figure 2:
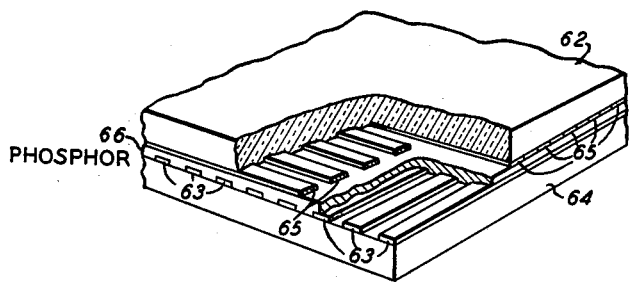
FIGURE 2 is a detailed showing of a modified luminescent plate for use with this invention.

Referring now to FIGURE 1 of the drawings, there is shown a plate or panel 11 attached for rotation about one of its upright edges on shaft 12. Plate 11, which is described in greater detail in connection with FIGURE 2, is generally perpendicular to the plane of the base 61 and comprises a layer of electroluminescent material 13, sandwiched between two sets of virtually intersecting conductors. By pulsing selected conductors, a selected point or points on the panel surface may be caused to glow briefly at a selected point in its rotation. When the panel is rotated at a high enough speed so that an image of one light flash still persists in the viewers eye at the time a second light flash occurs in the next successive panel rotation he seems to see a continuous moving spot of light in three dimensions on the indicator. In this embodiment one conductor set is made up of a number of curved conductors 15, 16, 17 and 18 on the front face of the plate as seen in FIGURE 1. The other conductor set on the back of the plate as seen in FIGURE 1 is made up of a number of conductors 20, 21, 22, and 23 which are shown in dotted lines in this view, the successive conductors being at increasing angles with respect to the plane of the base. No conductor of either set is electrically connected to any other conductor in that set. Although only a few widely spaced conductors have been shown in each set for purposes of illustration, a larger number of more closely spaced conductors would probably be used in actual practice to improve the precision of the device. Since the electroluminescent material 13 is of a type which will glow when subjected to an electric field of sufficient magnitude, selected areas of the plate may be caused to glow by applying a potential across the conductors which virtually intersect at the desired location.

In the exemplary system shown in FIGURE 1 the indicator is being used in connection with a radar system. When the particular system illustrated is turned on a timer 25 generates a pulse which is simultaneously fed to a delay element 26 and a keyer 27. The keyer in turn actuates transmitter 28 which generates a radar output signal that is fed to a duplexer 30 and then to a stacked beam antenna 31. Target echos which return to the antenna are then fed back through the duplexer to receiver 32. The receiver may be of the ordinary superheterodyne type now used in radar receivers including a local oscillator, a mixer, one or more tuned IF amplification stages, a video detector, one or more stages of video amplification, and a cathode follower output stage. The receiver output is simultaneously applied to one input lead of each of a number of coincidence or "and" gates 33, 34, 35, and 36. The other input lead of each of these coincidence gates is connected to adjacent areas of the multi-tap relay element 26. In this case one input lead of gate 36 is connected to portion 26a of the delay element while gate 35 is connected to portion 26b, gate 34 is connected to element 26c and gate 33 is conected to portion 26d. The element 26 may be any known delay element which may have multiple output taps along its length such as a delay line terminated in its characteristic impedance, or the like. When the timer 25 applies a pulse to one end of the delay element this pulse moves along the delay element from one portion to the next at set time intervals, thus applying a potential to one input of each successive coincidence gate at set time intervals. Alternatively, the timer may be designed to feed a number of pulses to the delay element in very rapid succession and a high speed ring counter may be used as the delay element. The outputs of the coincidence gates 33–36 are connected to amplifiers 37, 38, 40 and 41. The output of each of these amplifiers is connected to one of a group of concentric conducting rings 42, 43, 44, and 45. Thus, when input pulses are applied to both input leads of any one of the coincidence gates 33–36 in temporal coincidence from receiver 32 and a portion of delay element 26, the gate will actuate its amplifier which in turn will apply a relatively large voltage to one of the concentric conducting rings 42–45.

Since this indicator embodiment is analogous to the two dimensional PPI scan of an ordinary cathode ray-tube radar indicator, application of potential to one of the concentric conducting rings 42–45 which activates the curved conductor just above it in the electroluminescent panel serves to select the range of a target from the position of the system which for purposes of indication is at the bottom of the central cylinder 12 of the indicator. In effect, the timer 25 and delay element 26 set up a time base against which the time required for an echo pulse to return to the receiver from the object being detected, is measured. Since the time for a pulse to return to the receiver is directly proportional to the distance of the object being detected from the system this time comparison may be used directly to indicate distance between target and indicator. Put in another way the delay element counts off time between pulse transmission and pulse reception and selects one of the concentric conducting rings 42–45 for actuation from the receiver according to the elapsed time. Since the shaft of the antenna 31 which is driven by motor 49 directly drives the rotor of a selsyn generator 46 which is fed from an A.C. source 47 and since the output of the selsyn generator and A.C. lines are connected through connecting lines 50 to a selsyn motor 48 which drives the cylindrical shaft 12 of the electroluminescent indicating plate 11, the angular position of the radar antenna and the indicating plate 11 will always be the same. Thus, the bearing or azimuth angle of the target is directly related to the rotational position of the antenna which is highly directional.

As stated above the antenna 31 is of the stacked beam type. Each antenna portion is highly directional in both the vertical and horizontal planes and each successive portion is aimed at a slightly higher angle so that adjacent beams overlap slightly. Sensing elements 51, 52, and 53 are shown connected to each portion of the antenna for purposes of illustration, however in actual practice each portion of the antenna would be connected to a separate amplification channel in the receiver and the sensing devices would be applied to the amplifier output so as to allow the use of sensing devices of ordinary sensitivity. Each of these sensing devices is connected to the comparator 55 which compares the output from all of the sensing devices and puts out an output pulse on one of the lines connected to one of amplifiers 56, 57, 58, or 60 in accordance with the antenna portion carrying the pulse echo of the greatest magnitude. Since all of the antenna portions are aimed at slightly different vertical angles this mechanism effectively selects the height angle of the target from the radar system. The output of the selected amplifier from the group of amplifiers 56–60 is applied to its associated conductor on the back of the panel 11 depending on which one of these conductors 20–23 is selected for actuation according to the height angle of the target from the radar system. Alternatively, the system could use an antenna which reciprocated vertically during its rotation switching its output to different height angle conductors as it reciprocated. This reciprocation and switching could be accomplished either mechanically or electrically e.g. by switching to differently oriented reflective antenna portions the output of each being connected to one of the height angle indicators. Although the conductors connecting amplifiers 56–60 with panel conductors 20–23 are shown above the base 61 of the indicating device for purposes of illustration, in actual practice they would probably enter the indicating device through the top or bottom of the indicator mounting rod 12. The interconnecting conductors are then connected to the panel conductors through brushes rubbing against circular slip rings inside the shaft 12.

When a target comes into the range of the radar system potential is applied to one of the distance indicating conductors on the front of panel 11 as seen in FIGURE 1 through its associated conductive ring in the base 61 while a simultaneous pulse is applied to one of the height angle conductors on the back of panel 11 as seen in FIGURE 1. The magnitude of these pulses are so chosen that their sum will set up an electric field at the point of the conductors' virtual intersection sufficient to cause a bright short duration flash of light at this point on the panel and since these pulses are applied to the panel when it is at the same angular position as the antenna system, the glowing spot produced on the panel is indicative of the instantaneous three dimensional position of the target. Since the panel is rotated and therefore flashed or caused to intermittently glow at a rate of more than about 20 cycles per second, a continuous three dimensional position will appear to the viewer because although there is a short time lapse between successive flashes on the rotating panel this time period is shorter than the persistence of human vision. The target on the indicator appears to the viewer as a spot of light moving in three dimensions with a speed and direction analogous to that of the target because if the target is moving the light actually flashes at a different point during each successive rotation of the panel.

It should be noted that lower limit of the period of rotation of the device for this mode of operation is restricted only by the persistence of the image receptor, and that the upper limit is restricted only by the narrowness of pulses which can be generated to actuate the panel. Thus, if a three dimensional or stereo camera is used as an image receptor and its period of exposure is the same as the sweep period of the panel, there is no lower limit to the sweep period of the display. These two periods may be synchronized by actuating the camera shutter with a pulse generated by the rotation of the panel display. In order to avoid a streaklike appearance the length of the panel actuating pulses must be decreased as the rotational speed of the panel is increased, however in certain applications this streaking effect may be used to advantage e.g. to display a curved line.

The display device of this invention may also be used in a tracking mode as explained below in connection with FIGURE 4 or to display stationary or continuously changing lines or surfaces. For example, a line or vector may be represented on the device in three dimensions by merely selecting a number of points on the panel for actuation at the proper point in panel rotation; the points being representative of the line. A surface may be represented by maintaining pulses or A.C. voltage on a number of points on the panel with the points describing a section of the surface to be represented while quickly rotating the panel.

FIGURE 2 shows the construction of a plate similar to the rotatable display plate 11 in FIGURE 1 in greater detail. In this version the plate is sandwiched between two transparent non-conductive supporting members 62 and 64 of the glass, Mylar, or the like, for added rigidity and protection. Either or both of these members may be omitted from the structure if the remainder of the plate is sufficiently rigid and does not need protection. Above the lower support member 64 there are illustrated a number of transverse conductors 63 and a number of longitudinal conductors 65 on opposite sides of an electroluminescent phosphor layer 66. In this particular embodiment the groups of conductors on opposite sides of the phosphor layer, which may be said to constitute two conductor sets, are in a somewhat different configuration than that shown in the FIGURE 1 embodiment. In this case the conductors in each conductor set are in straight, equally spaced, parallel lines with the lines of each conductor set being substantially perpendicular to each other as viewed from either face of the plate. This conductor configuration allows for the presentation of information fed to the indicating device in X, Y, Z, coordinates as might be the case with a mathematical equation. The conductors themselves may be made of any transparent conductive material such as a thin evaporated layer of tin oxide or copper iodide which may be laid down through a mask. Alternatively, the conductors may be laid down as a uniform layer and areas between adjacent conductors may be etched or engraved away. The conductors may be as widely spaced as desired or may be very close together depending on the precision desired in the device. The electroluminescent material which is referred to in the art as a "phosphor," is of the type used in electroluminescent panels having an extremely low persistence after applied field extinction. This may comprise silicon carbide or zinc sulfide activated with manganese or copper, lead, etc. This "phosphor" is embedded in a matrix having a high dielectric constant such as polyvinyl chloride. Since the brightness with which "phosphors" of this type glow is directly related to the strength of the electric field applied to them, it is desirable to have a high average dielectric constant for the phosphor-embedded matrix mixture since this provides a means for supporting a high electric field in the phosphor. As a matter of fact, where high brightness is very critical materials having very high dielectric constants such as barium titanate may be mixed with the phosphor in the embedding matrix when the panel is fabricated so as to increase the average dielectric constant of the mixture. Since the brightness of the luminescence in the type of the phosphor disclosed herein is related both to the magnitude and rate of change of the applied electric field, it is preferable to apply a voltage of high magnitude with a high rate of change to the phosphor where high brightness is desired. For example, in certain applications it may be desirable to apply short bursts of A.C. voltages running up as high as 40,000 cycles per second rather than a single D.C. pulse across the phosphor at the point in panel rotation where it is to be actuated.

Since the panel is only operated intermittently during its rotation considerable voltage overloads may be applied to it. For example, if an electroluminescent panel which is designed for 100 volts in continuous operation is used as the panel in the display device of this invention, up to 400 or 500 volts may be applied to it, depending upon pulse width. At points where either of the activated conductors crosses an electrically "floating" conductor which provides a capacitative path joining the activated conductors, a voltage will exist between the activated and "floating" conductors. If a high voltage is applied to the activated conductors to get a bright light output at the point of activated conductor intersection, the voltage between activated and adjacent floating conductors is likely to be a sufficient magnitude to provide a dull glow or halation around each activated point referred to as crosstalk. In order to avoid this halation one of the conductor sets is mounted on a glass plate similar to plates 62 and 64 and spaced a few mils from the phosphor layer and used to apply a silent ionizing field discharge to the phosphor at the point where the selected conductors virtually intersect, as shown in FIGS. 6 and 7 of my copending application S.N. 167,672.

Figure 3:
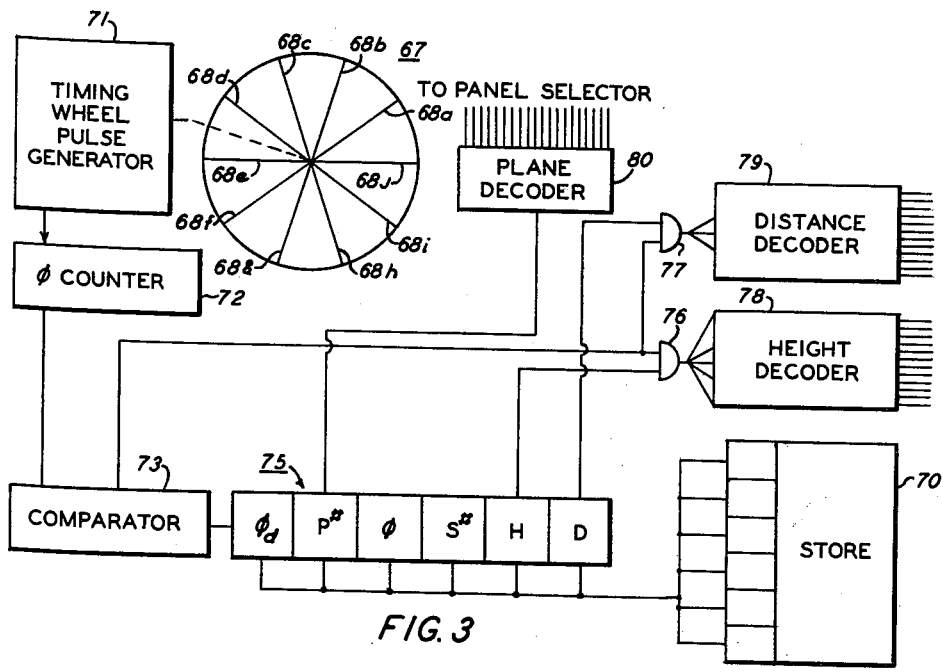
FIGURE 3 is a diagrammatic showing of a second embodiment of the display device incorporated in a complete information storage handling a display system.

In FIGURE 3 there is shown in plan a modified indicating device 67 with 10 panels 68A–68J which are of the same general construction as the panel 11 shown in FIGURE 1. In this instance the indicating device is fed from a memory store 70 which may be of any known type such as a magnetic core matrix, a rotating magnetic drum, or an electrostatic memory drum as disclosed in FIGURES 2–4 of my copending application S.N. 638,037, filed February 4, 1957. Each of the ten panels 68A–68J is placed 36° from adjacent panels and the whole panel array is rotated at a speed of 20 revolutions per second. In this particular system each panel of the display device is assigned to a particular aircraft which is under surveillance and the recent track of each plane is given by displaying its last ten positions in very fast succession within one panel array rotation. An airplane flying into the target area will be picked up by the radar, given an identification number by the system, and its position displayed during the time it is in the target area.

The system uses a basic word of ten decimal digits to give the angular or phi value for display, the identification number of the plane, the actual phi value, the height and distance coordinate values, and the sequence number. This information is fed into the system from an analog to digital converter fed from a radar input. The display phi value is always equal to the actual phi value plus ten times the plane number. The sequence number indicates the position in the track or in other words how many times new position information has been received from this particular plane.

Connected to the shaft of the indicator 67 for rotation therewith is a timing wheel pulse generator 71 connected to a counter 72, the output of which is in turn connected to a comparator 73. Thus, as the panel array and timing wheel pulse generator rotate, a number of closely spaced successive pulses are fed to the counter 72 so that its output continues to increase to a maximum during one complete revolution of the indicating panel array. The last pulse generated during one revolution of the panel array serves to reset the counter to zero. The complete content of the memory store 70 is cycled into and through resistor 75 for each successive count on the phi counter. Register 75 includes sections for phi display, plane number, actual phi value, sequence number, height coordinates and distance coordinates as indicated by the letters on the register sections. The phi display section of the register is connected to comparator 73 and when the comparator finds agreement between phi counter 72 and phi display section of the register it activates one input of coincidence gates 76 and 77. Since the height and distance coordinate sections of the register 75 are connected to the other inputs of the coincidence gates 76 and 77, the gates will be opened at this point to feed the instantaneous values of height and distance in the register to height and distance decoders 78 and 79. At the same time, the plane number section of the register 75 feeds an output to the plane decoder 80 which selects the panel to be actuated. The distance and height decoders then actuate selected conductors in the panel chosen by the plane decoder so that a flash of light appears at a selected position on a selected panel. Panel selection by the plane decoder may operate in the following exemplary manner. Each height decoder output line to a different height coordinate on one of the panels and analagous coordinates in all other panels are connected together so that if an output pulse is applied to the highest coordinate in one panel it is also applied to the other nine panels. Distance decoder output lines are similarly connected to distance coordinates in the panels except that each distance cordinate is preceded by a coincidence gate and in order for an outlet to appear across any selected distance coordinate it must receive simultaneous inputs from an output of the distance decoder and an output of the plane decoder. In this instance each of the plane decoder outputs is connected to one input of all the coincidence gates in one particular panel so that in effect the plane decoder selects the panels to which the distance decoder will apply its output signal. Amplification of the output signals may be provided if necessary, and each of the panels may be of a different color. Information in the store is periodically updated by cycling the whole contents of the store through a register and comparing it with new information in a second register, rejecting any non-conforming old information, and inserting the new compared information in its place.

Figure 4:
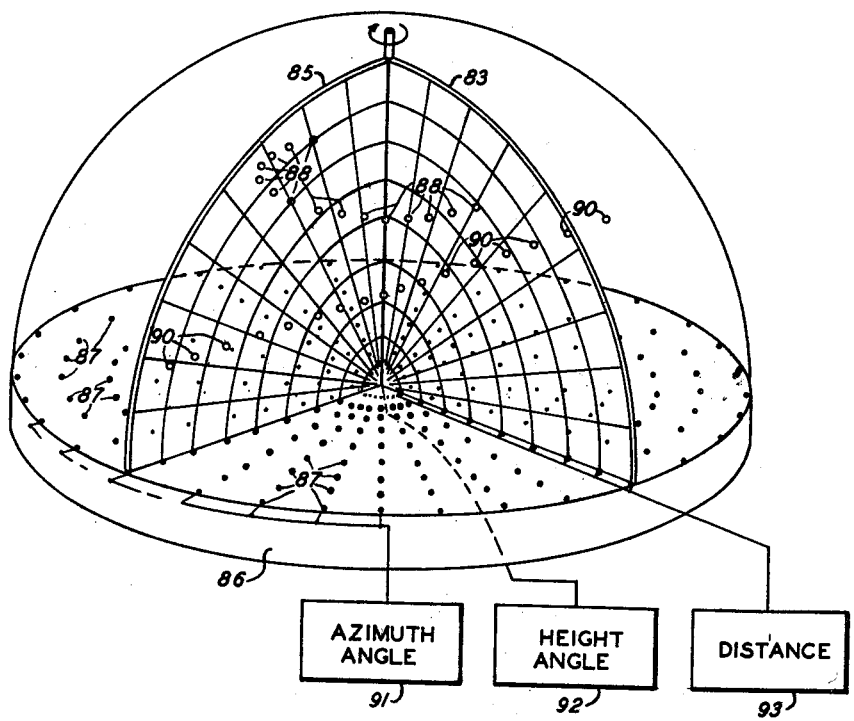
FIGURE 4 shows the display device utilizing a modified coordinate system and contact switching.
Figure 4A:
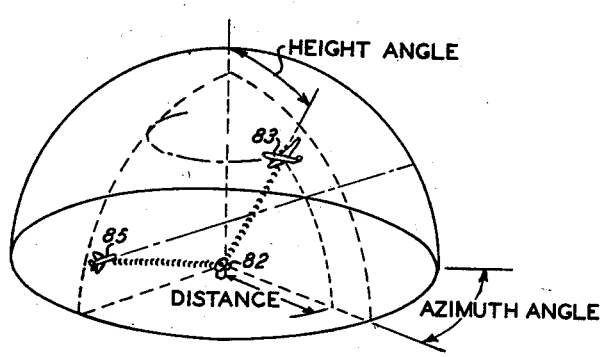
FIGURE 4A is a pictorial showing of original conditions which might be reproduced by the indicator described in FIGURE 4.

FIGURE 4A is a pictorial representation of a radar antenna 82 detecting two planes 83 and 85 headed on different courses. The figure also shows how the height, azimuth angle, and distance of the target with respect to the radar antenna are taken.

FIGURE 4 describes a three dimensional indicating device similar in nature to that shown in FIGURE 1. However, the base of the indicator shown in FIGURE 4, instead of using a number of continuous concentric conductive rings such as those shown in the FIGURE 1 embodiment for activating the distance coordinates of the display panels and depending upon pulsing of the concentric rings at the proper time in the rotation of the plane, the indicating device illustrated in FIGURE 4 utilizes a number of discrete dot-like contacts 87 in the base 86. This system avoids the necessity for very sharp pulse application to activate the rotating panels since the voltage need not be removed from a particular contact which has just been used to activate one panel until the next succeeding panel approaches that contact. However, the ordinary problems associated with flashover in circuit breakers may also occur in this system especially near the center of rotation of the indicator where adjacent dot contacts are very close to each other. This type of flashover is eliminated by maintaining a very thin film of insulating oil such as a silicone oil on the top surface of the base.

In addition to illustrating a modified form of switching, FIGURE 4 also shows how the indicating device of this invention may be used to display the recent track of targets. In this case, the two panels, 83 and 85, contain electroluminescent materials which glow in different colors when excited. For example, plate 83 might glow green and plate 85 might glow blue. By using a memory device of the type shown in connection with FIGURE 3 as an input for the system shown in FIGURE 4, each of the panels having been assigned to one plane may be caused to glow in selected spots as it passes over each radial line of point contacts 87 so as to show the last ten or twelve positions of the plane assigned to this particular panel in the color of this panel. For example, panel 83 by flashing at points 88 clearly displays the recent track of one plane while panel 85 by flashing at points 90 shows the track of a second plane in a second color. Thus, by utilizing this mode of operation the viewer may see the courses of different planes and by switching to the FIGURE 1 mode of operation he may view only the instantaneous plane positions. Switching circuits 91, 92, and 93, shown diagrammatically in this figure, are similar in nature to those shown in connection with the previous figures. Since the conductor configuration used in this and the FIGURE 1 embodiments is analogous to the information of a radar return which is in terms of height angle, azimuth angle and distance, a minimum of circuitry is needed for interconnection of the radar system and the indicator. Although the device shown uses a one quadrant indicating panel, a sonar system in a submerged vessel or a radar system aboard a plane in flight might use a two quadrant panel to indicate distance below the plane or vessel as well as the height above it of a target.

While the specific embodiments shown and described in this specification and drawings are admirably adapted to fulfill the stated objects, it should be understood that it is not intended to confine the invention to these disclosed embodiments since the invention itself is susceptible of embodiment in many various forms all coming within the scope of the following claims. For example, many different conductor configurations could be used on the rotating panel device, different numbers of display panels may be used, different colors of luminescent materials may be used, many different actuating and switching circuits may be used as inputs to the indicating device, etc., etc. Any radar system which separates radar signals into height layers such as U.S. Patent 2,995,742 to Braden may easily be adapted for use with the indicator of this device. In the FIGURE 1 embodiment the conducting concentric rings 42–45 could be completely eliminated with all input leads running up shaft 12 making connection to leads 15–18 at the left hand edge of panel 11 as seen in FIGURE 1. In addition the radar system might be switched to a tracking mode, and angle indications could be provided around the outer circumference of the base 61 so as to directly indicate the bearing of a target when both the panel and antenna locked on a target. In addition, the system may be switched to cover various ranges. For example, in the FIGURE 1 system by merely switching different delay elements into the system in place of delay element 26 the range covered by the indicator could be changed. Instead of rotating the light producing panel might also reciprocate in a direction perpendicular to its plane. In short the disclosed embodiments of this invention are exemplary in every sense of the word.

What is claimed is:

1. A three dimensional recording and display device comprising a signal responsive surface adapted to produce low persistence light in any of a number of spots included within its extent, means to move said surface so that it sweeps out a volume of space, means to actuate said signal responsive surface at at least one selected spot included within its extent and at at least one selected position in its sweep in accordance with the characteristics of an input signal applied to said actuating means, a stereoscopic camera in light gathering relationship with said light producing surface and means to synchronize the exposure period of said stereoscopic camera with the sweep period of light producing surface and means to advance the film in said sterescopic camera in response to the termination of said exposure.

2. A three dimensional recording and display device comprising a panel including a layer of electroluminescent material, a first grid composed of a plurality of non-intersecting conductors on one side of said layer, and a second grid composed of a plurality of non-intersecting conductors on the opposite side of said layer, said grids being so oriented that projections of both grid structures form an intersecting pattern, means to move said panel so that it sweeps out a volume of space, means to apply a voltage across at least one conductor in each grid at one or more selected points in the sweep of said panel, said voltage being of at least a magnitude to excite said electroluminescent material to luminescence at the point of virtual intersection of excited conductors, a stereoscopic camera in light gathering relationship with said electroluminescent panel and means to synchronize the exposure period of said stereoscopic camera with the sweep period of said electroluminescent panel, said synchronizing means being effective to advance the recording film in said camera at the end of each exposure period.

3. A three dimensional display device including at least one panel, means to rotate said panel about an axis substantially within the plane of said panel, said panel including a layer of electroluminescent material, a first grid composed of a plurality of non-intersecting conductors on one side of said layer, a second grid composed of a plurality of non-intersecting conductors on the opposite side of said layer, the conductors of all of said grids being angularly spaced and radiating outwardly from a point on said axis of rotation, the conductors of the other of said two grids being arcuate and concentric about said point on said axis of rotation, at least one of said grids being spaced slightly from said layer of electroluminescent material, and means to apply a voltage across at least one conductor in each grid at one or more selected points in the rotation of said panel, said voltage being of a magnitude sufficient to initiate an ionizing field discharge between said conductors at the point of virtual intersection of excited conductors.

4. A three dimensional display device comprising at least two panels, each panel being composed of a layer of electroluminescent material which luminesces with the light of a different wave length, a first grid composed of a plurality of non-intersecting conductors on one side of each of said electroluminescent layers and a second grid composed of a plurality of non-intersecting conductors on the opposite side of and spaced slightly from each of said electroluminescent layers, said grids on each of said panels being so oriented that a projection of both grid structures in any one panel forms an intersecting pattern, means to move said panels so that they sweep out a volume of space and means to apply a voltage across at least one conductor in each grid of each of said panels at one or more selected points in the sweep of said panels, said voltages being of at least a magnitude to initiate ionizing field discharge at the point of virtual intersection of excited conductors in said panels thereby causing electroluminescent material beneath said excited points to glow.

5. A three dimensional display device including a plurality of panels, means to rotate said panels about an axis substantially within the planes of said panels, each of said panels including a layer of an electroluminescent material which glows with light of a different wave length when electrically excited, each of said panels further including a first grid composed of a plurality of non-intersecting conductors on one side of said electroluminescent layer, a second grid composed of a plurality of non-intersecting conductors on the opposite side of said layer, the conductors of one of said grids being angularly spaced and radiating outwardly from a point on said axis of rotation, the conductors of the other of said two grids being arcuate and concentric about said point on said axis of rotation and means to apply a voltage across at least one conductor in each grid of a panel at one or more selected points in the rotation of said panel, said voltage being of at least a magnitude to excite said electroluminescent material to luminescence at the point of virtual intersection of excited conductors.

References Cited in the file of this patent

UNITED STATES PATENTS

| | | |
|---|---|---|
| 2,749,480 | Ruderfer | June 5, 1956 |
| 3,097,261 | Schipper | July 9, 1963 |